(12) United States Patent
Dai

(10) Patent No.: US 8,081,247 B2
(45) Date of Patent: Dec. 20, 2011

(54) PARTIAL ROW READOUT FOR IMAGE SENSOR

(75) Inventor: Tiejun Dai, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 780 days.

(21) Appl. No.: 12/141,808

(22) Filed: Jun. 18, 2008

(65) Prior Publication Data

US 2009/0316030 A1 Dec. 24, 2009

(51) Int. Cl.
H04N 3/14 (2006.01)
H04N 5/335 (2011.01)
H04N 9/04 (2006.01)

(52) U.S. Cl. ........................................ 348/308; 348/272

(58) Field of Classification Search .................. 348/272, 348/279, 280, 273, 308
See application file for complete search history.

(56) References Cited

U.S. PATENT DOCUMENTS

| | | | |
|---|---|---|---|
| 4,974,066 A | 11/1990 | Tusji | |
| 5,604,530 A | 2/1997 | Saito et al. | |
| 6,452,634 B1 | 9/2002 | Ishigami et al. | |
| 6,456,317 B1 * | 9/2002 | Matsumoto et al. | 348/68 |
| 6,606,122 B1 * | 8/2003 | Shaw et al. | 348/302 |
| 6,661,457 B1 * | 12/2003 | Mathur et al. | 348/273 |
| 6,953,923 B2 | 10/2005 | Yang et al. | |
| 2003/0183829 A1 * | 10/2003 | Yamaguchi et al. | 257/88 |
| 2004/0135910 A1 | 7/2004 | Nam | |
| 2004/0233294 A1 * | 11/2004 | Zheng et al. | 348/222.1 |
| 2005/0012836 A1 | 1/2005 | Guidash | |
| 2005/0145777 A1 * | 7/2005 | Barna et al. | 250/208.1 |
| 2005/0151868 A1 * | 7/2005 | Fraenkel et al. | 348/308 |
| 2007/0024904 A1 * | 2/2007 | Baer et al. | 358/1.16 |

FOREIGN PATENT DOCUMENTS

| | | |
|---|---|---|
| EP | 0757497 A2 | 2/1997 |
| EP | 0923236 A2 | 6/1999 |
| EP | 1349399 A2 | 10/2003 |
| WO | WO 00/57634 | 9/2000 |

OTHER PUBLICATIONS

PCT/US2009/045867, PCT International Search Report and Written Opinion of the International Searching Authority, mailed Aug. 6, 2009, 18 pages.

* cited by examiner

*Primary Examiner* — David Ometz
*Assistant Examiner* — Carramah J Quiett
(74) *Attorney, Agent, or Firm* — Blakely Sokoloff Taylor & Zafman LLP

(57) ABSTRACT

An image sensor includes a color filter array, sense amplifiers, multiplexing circuitry, and an output. The color filter array acquires image data using an array of M columns and N rows of pixels. The sense amplifiers are coupled to the color filter array for reading out image data from the color filter array. The multiplexing circuitry couples the sense amplifiers to the color filter array, wherein each sense amplifier is time shared across multiple columns and multiple rows. The output is coupled to receive the image data from the sense amplifiers and output the image data off-chip.

17 Claims, 4 Drawing Sheets

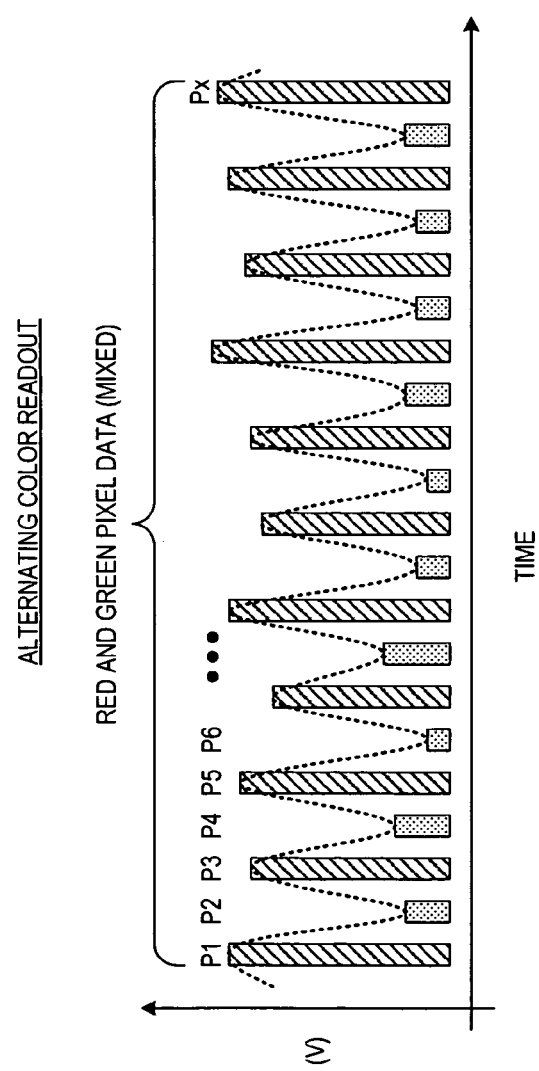
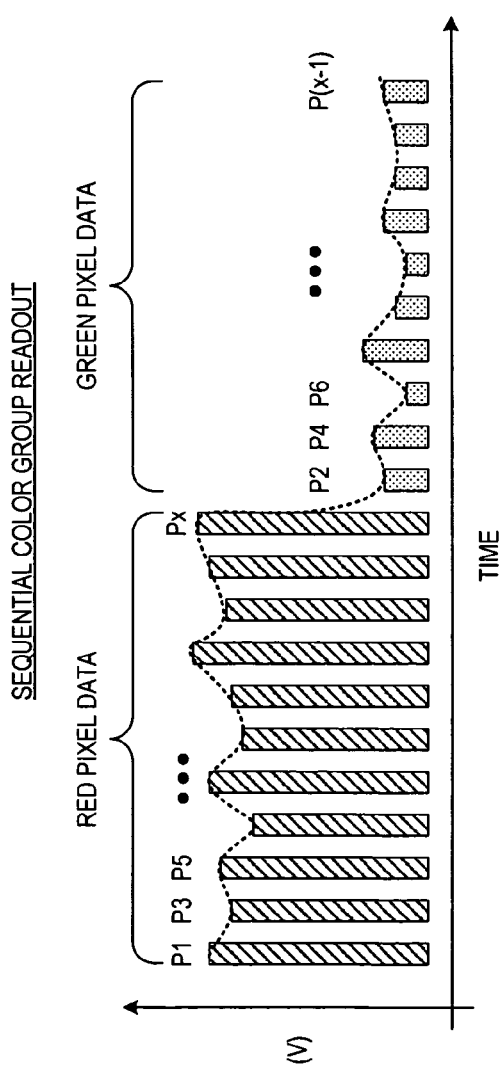
FIG. 4A (PRIOR ART)
FIG. 4B

PARTIAL ROW READOUT FOR IMAGE SENSOR

TECHNICAL FIELD

This disclosure relates generally to image sensors, and in particular but not exclusively, relates to a readout mechanism for CMOS image sensors.

BACKGROUND INFORMATION

Image sensors have become ubiquitous. They are widely used in digital still cameras, cellular phones, security cameras, as well as, medical, automobile, and other applications. The technology used to manufacture image sensors, and in particular, complementary metal-oxide-semiconductor ("CMOS") image sensors ("CIS"), has continued to advance at great pace. For example, the demands of higher resolution and lower power consumption have encouraged the further miniaturization and integration of these image sensors.

One field of application in which size and image quality is particularly important is medical applications (e.g., endoscopes). For medical applications the chip must typically be small while providing a high quality image. In order to achieve these characteristics, for a given chip size, the photosensitive apertures should be as large as possible, while peripheral circuitry should be as limited as possible.

Medical sensors often need to pass high quality image information over long wires (e.g., 4 m) to a remote unit (e.g., computer and display). These wires are typically relatively thin having a high resistance and capacitance compared to thicker coaxial cables used for televisions. As such, these thin cables are poor conductors of high frequency signals. Since these medical cables are relatively low pass filters with limited transmission bandwidth, sharp signal transitions (e.g., sharp rising/falling edges) are not effectively passed, resulting in a degraded final image quality.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 4A is a chart illustrating a conventional image data readout from an image sensor.

FIG. 4B is a chart illustrating a sequential color group readout technique for reading out image data from an image sensor, in accordance with an embodiment of the invention.

DETAILED DESCRIPTION

Embodiments of an apparatus and method of operation for a partial row readout image sensor are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
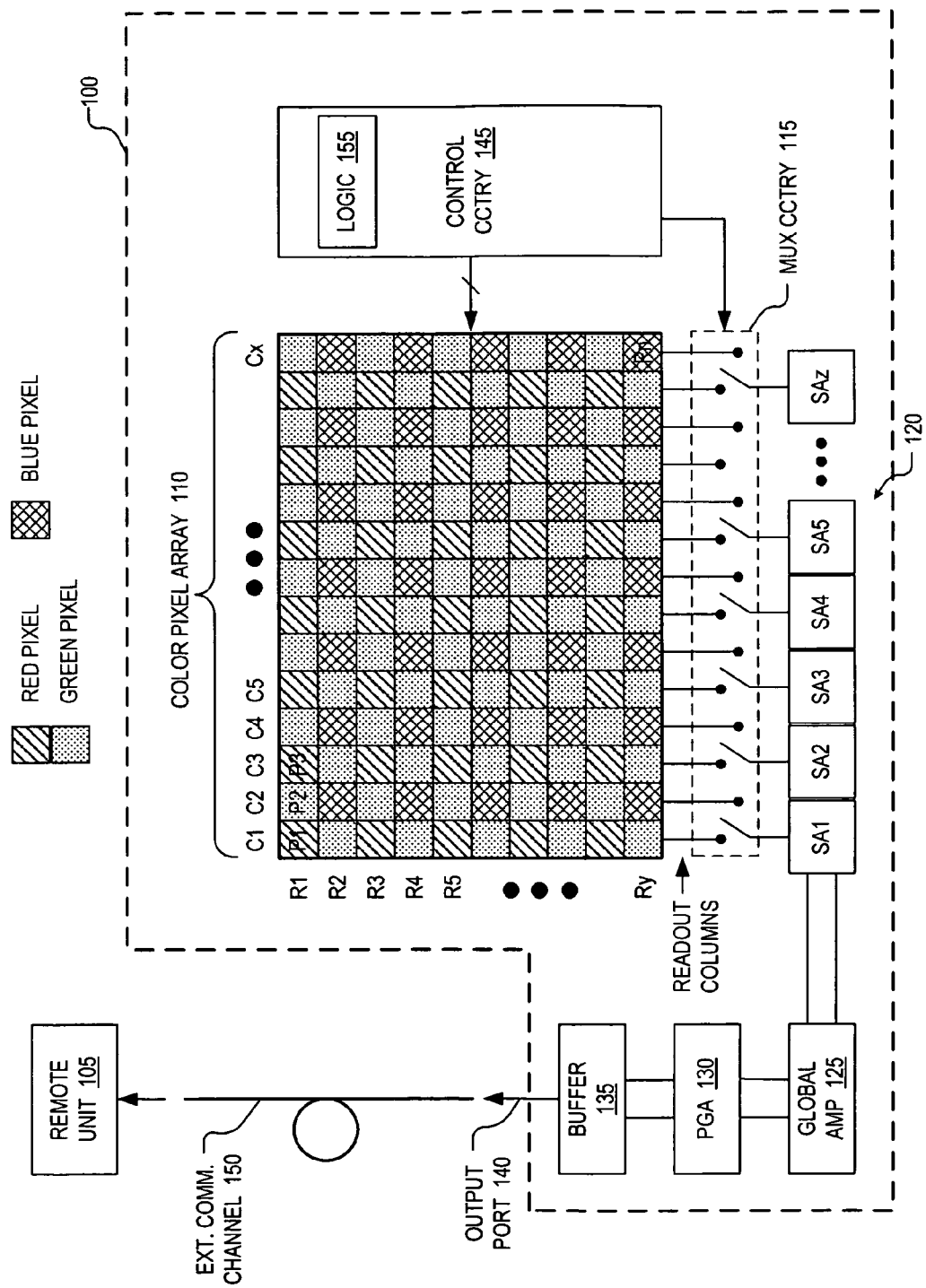
FIG. 1 is a functional block diagram illustrating components of an image sensor coupled to a remote unit, in accordance with an embodiment of the invention.

FIG. 1 is a functional block diagram illustrating components of an image sensor 100 coupled to a remote unit 105, in accordance with an embodiment of the invention. The illustrated embodiment of image sensor 100 includes a color pixel array 110, multiplexer ("MUX") circuitry 115, sense amplifiers ("SAs") 120, a global amplifier 125, a programmable gain amplifier ("PGA") 130, a buffer 135, an output port 140, and control circuitry 145.

Color pixel array 110 is a two-dimensional ("2D") array of imaging pixels (e.g., pixels P1, P2 . . . , Pn) having X number of pixel columns and Y number of pixel rows. In one embodiment, each pixel is a complementary metal-oxide-semiconductor ("CMOS") imaging pixel. Color pixel array 110 may be implemented as either a front side illuminated pixel array or a backside illuminated image pixel array. As illustrated, each pixel is arranged into a row (e.g., rows R1 to Ry) and a column (e.g., column C1 to Cx) to acquire image data of a person, place, or object, which can then be used to render a 2D image of the person, place, or object.

Color pixel array 110 may also be referred to as a color filter array ("CFA"). The CFA may capture color image data using a number of techniques including additive filters and subtractive filters. For example, color pixel array 110 may be implemented as a Bayer pattern or mosaic of red, green, and blue additive filters (e.g., RGB, RGBG or GRGB) or a color filter pattern of cyan, magenta, yellow, and key (black) subtractive filters (e.g., CMYK). Other CFAs may also be used, such as a mosaic of red, green, blue, and emerald filters (e.g., RGBE), a color filter pattern of cyan, yellow, green, and magenta filters (e.g., CYGM), a color filter pattern of cyan, magenta, yellow, and white filters (e.g., CMYW), a color filter pattern of red, green, blue, and white filters (e.g., RGBW), a combination of these, or otherwise.

After each pixel has acquired its image data or image charge, the image data is readout by the readout circuitry including: SAs 120, global amplifier 125, PGA 130, and buffer 135. SAs 120 are coupled to the readout columns of color pixel array 110 to readout the image data on each column. In one embodiment, the image data is readout as an analog voltage level on each readout column. The readout image data is then sequentially provided to global amplifier 125 for amplification. After amplification by global amplifier 125, the serialized image data is provided to PGA 130 where it is once again amplified. PGA 130 provides a programmable gain that can be adjusted based on the particular application needs. Finally, the serialized image data is temporarily buffered prior to output by buffer 135. In one embodiment, buffer 135 may be synchronized to an external clock signal provided by remote unit 105. In one embodiment, the image data is output from buffer 135 on output port 140 to an external communication channel 150 for delivery to remote unit 105.

Although the illustrated embodiment of image sensor 100 outputs analog image data, other embodiments may include analog-to-digital converters ("ADC") integrated into image sensor 100 for outputting digital image data. However, in many medical device applications, it is often desirable to minimize the overall chip size of image sensor 100 while maximizing the on-die real estate devoted to color pixel array 110 to achieve the greatest possible image quality. As such, in the illustrated embodiment ADC circuitry has been pushed off-chip into remote unit 105 to reduce on-die real estate consumed by circuitry peripheral to color pixel array 110.

Embodiments of the present invention use MUX circuitry 115 to timeshare each SA 120 across multiple rows and columns of pixels. From a functional perspective, MUX circuitry 115 may also be considered to include the column readout lines. In the illustrated embodiment, each SA 120 reads out the image data associated with two columns of pixels (and all rows of pixels in the associated column) and therefore may be referred to as a half-row readout embodiment. However, other embodiments may timeshare three or more columns of pixels for each SA 120. In this manner, fewer SA 120 (e.g., ½, ⅓, ¼, 1/n, etc.) are necessary when compared to using a single SA 120 for each column. As such, the number of column gain circuits and hold capacitors associated with each SA is reduced.

Control circuitry 145 controls the operation of color pixel array 110 and MUX circuitry 115. For example, control circuitry 145 may operate as a decoder for configuring MUX circuitry 115 and a row selector for color pixel array 110. Control circuitry 145 may execute logic 155 for determining which rows/columns are selected and which SAs 120 are coupled via MUX circuitry 115 at a given time. Logic 155 may represent executable code (e.g., software or firmware), hardware logic, or a combination of both. Other functionality included within control circuitry 145 may include generation of reset signals and shutter signals for controlling image acquisition. In one embodiment, the shutter signal is a global shutter signal for simultaneously enabling all pixels within color pixel array 110 to simultaneously capture their respective image data during a single acquisition window (exposure period). In an alternative embodiment, the shutter signal is a rolling shutter signal whereby each row, column, or group of pixels is sequentially enabled during consecutive acquisition windows.

FIG. 1 illustrates SAs 120 coupled to readout column lines. However, it should be appreciated that SAs 120 can also be coupled to readout row lines. In fact, the designation of a line of pixels as either a column or a row is merely one of convenience to differentiate perpendicular lines of pixels. Accordingly, the designation of a line of pixels as either a column or a row is arbitrary and the designation or label can be interchangeably swapped.

Remote unit 105 may represent a variety of remote devices for storing, manipulating, and/or rendering the image data output from image sensor 100. External communication channel 150 may be a serial channel for communicating serialized image data. Alternatively, image sensor 100 may output image data as a parallel signal and therefore external communication channel 150 may also be a multipath communication channel. External communication channel 150 may be implemented as a wireless link, a wired link, one or more solid conductors, one or more fiber optics, or other known communication media.

In one embodiment, remote unit 105 includes a display and head control unit for a medical device, such as an endoscope, while image sensor 100 is incorporated into the end of the endoscope itself. In this medical device application, external communication channel may be implemented with a thin four conductor cable including a clock channel, a data channel, a ground conductor, and a power conductor. In medical device applications, the cables can be relatively long (e.g., 4 m) and thin. As such, these cables may have a relatively low bandwidth. To compensate, control circuit 145 may execute logic 155 to output the image data off-chip in sequential color groups where each color group includes image data associated with a plurality of same color pixels. By doing so, steep or abrupt voltage level transitions in the output signal are reduced thereby improving the signal quality received at remote unit 105. This sequential color group output technique is more fully discussed below in connection with FIGS. 4A and 4B.

Figure 2:
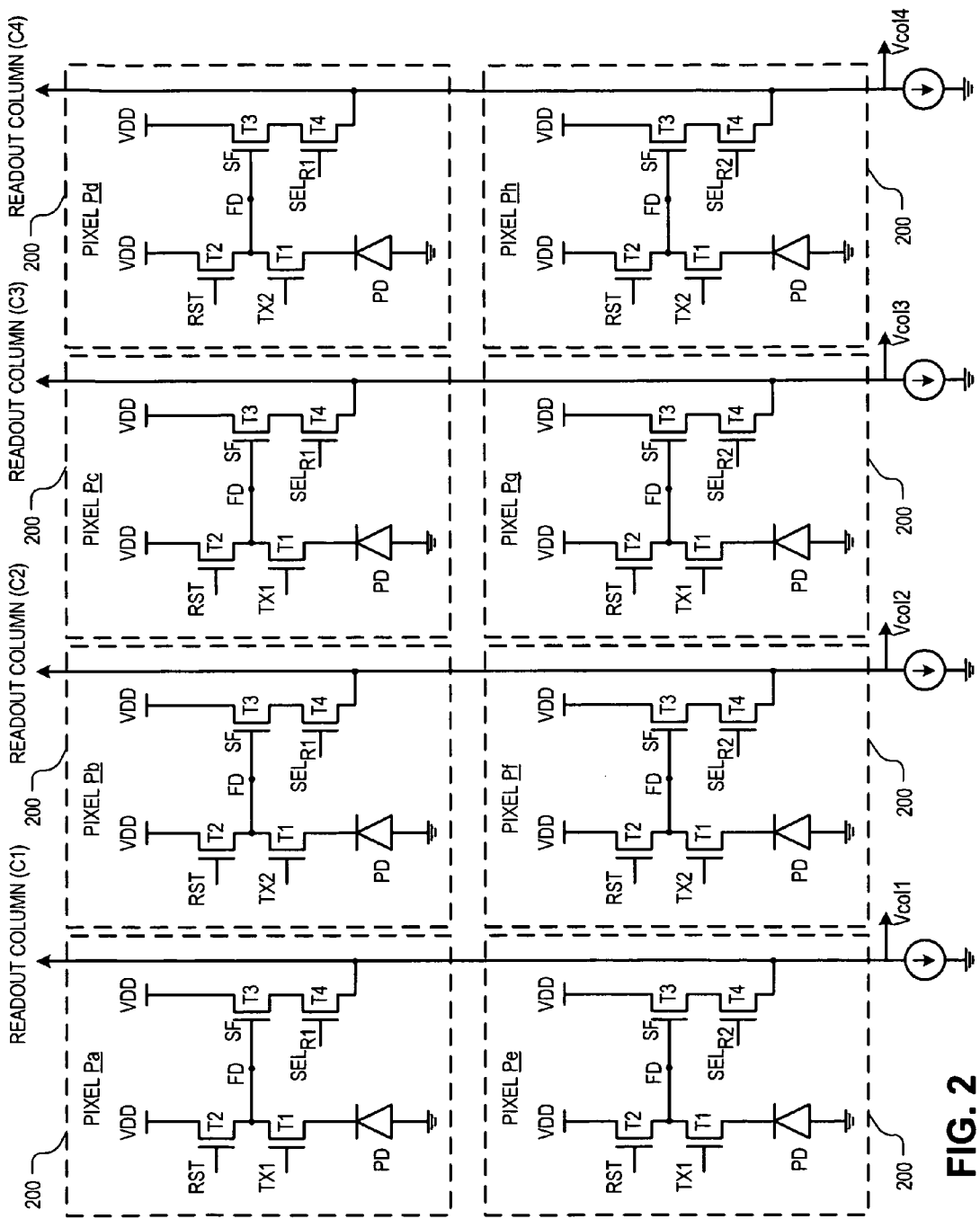
FIG. 2 is a circuit diagram illustrating pixel circuitry of eight four transistor ("4T") pixels within an imaging pixel array, in accordance with an embodiment of the invention.

FIG. 2 is a circuit diagram illustrating pixel circuitry 200 of eight four-transistor ("4T") pixels within a color pixel array, in accordance with an embodiment of the invention. Pixel circuitry 200 is one possible pixel circuitry architecture for implementing each pixel within color pixel array 110 of FIG. 1. However, it should be appreciated that embodiments of the present invention are not limited to 4T pixel architectures; rather, one of ordinary skill in the art having the benefit of the instant disclosure will understand that the present teachings are also applicable to 3T, 5T, 6T, and various other pixel architectures. Furthermore, FIG. 2 illustrates a half row readout embodiment; however, other embodiments such as ¼ row readout or 1/n row readout are also possible, as discussed below.

In FIG. 2, pixels Pa through Ph are arranged in two rows (e.g., rows R1 and R2) and four columns (e.g., columns C1, C2, C3, and C4). The illustrated embodiment of each pixel circuitry 200 includes a photodiode PD, a transfer transistor T1, a reset transistor T2, a source-follower ("SF") transistor T3, and a select transistor T4. During operation, transfer transistor T1 receives a transfer signal TX (e.g., either TX1 or TX2 for a half row readout embodiment), which transfers the charge accumulated in photodiode PD to a floating diffusion node FD. In one embodiment, floating diffusion node FD may be coupled to a storage capacitor for temporarily storing image charges. In the half row readout embodiment, it takes two readout cycles per row to readout the entire row of data. For a 1/n row readout embodiment, n number of TX signals are used and it takes n readout cycles per row.

Reset transistor T2 is coupled between a power rail VDD and the floating diffusion node FD to reset the pixel (e.g., discharge or charge the FD and the PD to a preset voltage) under control of a reset signal RST. The floating diffusion node FD is coupled to control the gate of SF transistor T3. SF transistor T3 is coupled between the power rail VDD and select transistor T4. SF transistor T3 operates as a source-follower providing a high impedance connection to the floating diffusion FD. Finally, select transistor T4 selectively couples the output of pixel circuitry 200 to the readout column line under control of a select signal SEL.

In one embodiment, the TX signal (e.g., TX1 or TX2), the RST signal, and the SEL signal are generated by control circuitry 145. In an embodiment where color pixel array 110 operates with a global shutter, the global shutter signal is coupled to the gate of each transfer transistor T1 in the entire color pixel array 110 to simultaneously commence charge transfer from each pixel's photodiode PD. Alternatively, rolling shutter signals may be applied to groups of transfer transistors T1.

Figure 3:
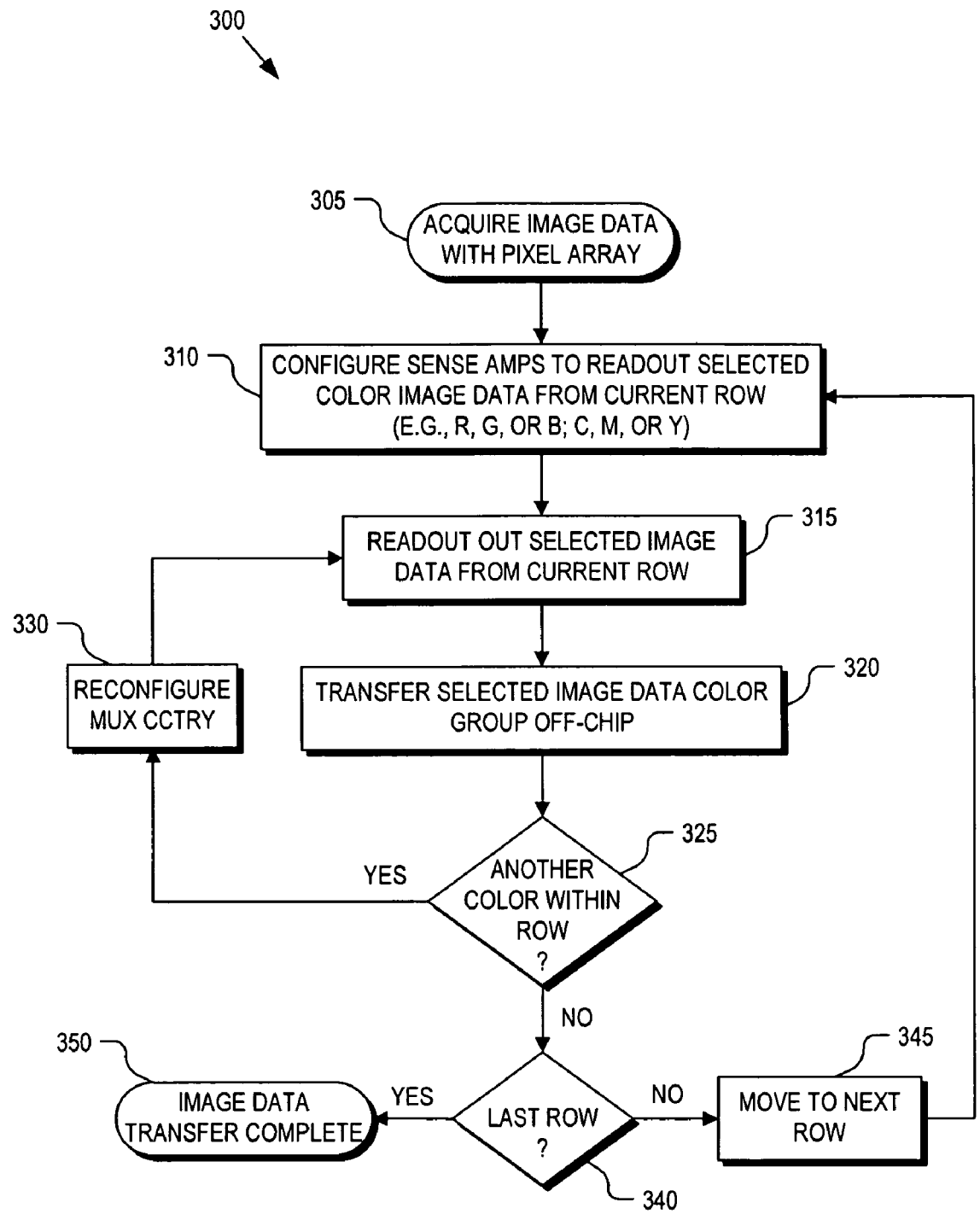
FIG. 3 is a flow chart illustrating operation of an image sensor, in accordance with an embodiment of the invention.

FIG. 3 is a flow chart illustrating a process 300 for operation of image sensor 100, in accordance with an embodiment of the invention. The order in which some or all of the process blocks appear in process 300 should not be deemed limiting. Rather, one of ordinary skill in the art having the benefit of the present disclosure will understand that some of the process blocks may be executed in a variety of orders not illustrated.

In a process block 305, image data is acquired by color pixel array 205. Prior to readout, this image data is stored internal to each pixel as an image charge, until each pixel is selected to output its image voltage on its associated readout column. In a process block 310, control circuitry 220 selects which pixels to read out by configuring MUX circuitry 115 and selecting the appropriate pixel row (via the SEL signal in FIG. 2). However, instead of outputting an entire row at a time, control circuitry 220 timeshares SAs 120 via appropriate configuration of MUX circuitry 115. Accordingly, image data associated with subgroups of pixels within a single row are readout of color pixel array 110. These subgroups can be selected based on pixel color. Since FIG. 1 illustrates an RGBG Bayer CFA, if row R1 is the currently selected row, then one of two groups of color pixels (e.g., red pixels or green pixels) can be selected at a time.

In a process block 315, the red pixel data is readout on the column lines into SAs 120. The red pixel data is then serially read from SAs 120 into global amplifier 125 and PGA 130 where it is sequentially amplified and temporarily buffered by buffer 135. Finally, in a process block 320, the image data is transferred off-chip via external communication channel 150 as a sequential color group.

If another color group of image data remains unread within the current row of color pixel array 110 (decision block 325), then control circuitry 145 reconfigures MUX circuitry 115 to select the next color group (process block 330). Process 300 then repeats process blocks 315 and 320 to readout the green pixel data from the green pixels within row R1. Once all color groups within the current row have been readout, process 300 moves to the next row (process block 345) and repeats process blocks 310, 315, 320, and 330 for the next row. In the case of the RGBG Bayer CFA illustrated in FIG. 1, green pixel data and blue pixel data is readout from row R2 in two separate sequential color groups. Process 300 repeats itself until all color groups in all rows have been readout (decision block 340), at which point the image data has been entirely transferred off-chip (process block 350).

FIGS. 4A and 4B are charts illustrating the difference between a conventional alternating color readout technique (FIG. 4A) and the sequential color group readout technique (FIG. 4B) described above. It is often the scenario where the image being captured is primarily one color, particularly in the field of medical devices (e.g., primarily red). In the scenario of a primarily red image, when reading out row R1 of the Bayer pattern CFA illustrated in FIG. 1, the red and green pixels produce dramatically different signal values (e.g., voltage values). The red pixels produce high signal values while the green pixels produce low signal values. The alternating color readout technique which reads out an entire row of pixels and transfers the data off-chip in the same order as the pixels appear in the CFA, generates sharp rising and falling edges from one image value to the next. In order to accurately convey the image data illustrated in FIG. 4A, a relatively high bandwidth communication channel 150 is needed. If a low bandwidth channel is used, such is often the case in medical applications, the signal can be degraded by overshot and oscillations.

Advantageously, the sequential color group readout technique groups image data from similarly colored pixels within the same row together and transfers this data off-chip as an uninterrupted serial sequence of image values. As illustrated in FIG. 4B, the transitions between adjacent image values is significantly less abrupt (except between color groups), and therefore requires relatively less bandwidth to transfer than the alternating color readout technique.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of improving image quality output from an image sensor on a serial communication channel, the method comprising:
   acquiring image data within a color pixel array;
   reading out a first portion of the image data from a first group of two or more pixels all storing data of a first color; and
   reading out a second portion of the image data from a second group of two or more pixels all storing data of a second color different from the first color, wherein the first portion is readout prior to reading out any of the second portion;
   serially exporting the first portion of the image data off-chip of the image sensor to the serial communication channel; and
   serially exporting the second portion of the image data off-chip of the image sensor to the serial communication channel after serially exporting all of the first portion,
   wherein the first group comprises pixels of the first color within a first row of the color pixel array and the second group comprises pixels of the second color also within the first row of the color pixel array.

2. The method of claim 1, wherein the communication channel comprises a serial data cable for transporting the image data off-chip.

3. The method of claim 1, wherein the image data is transported off-chip as a serialized-analog-voltage signal.

4. The method of claim 1, further comprising:
   reading out a third portion of the color image data from a third group of two or more pixels all storing data of a third color different from the first and second colors, wherein the third portion is readout after the first and second portions; and reading out a fourth portion of the color image data from a fourth group of two or more pixels all storing data of the second color, wherein the fourth portion is readout after the first, second, and third portions.

5. The method of claim 4, wherein the third and fourth groups comprise pixels within a second row of the color pixel array different from the first row.

6. The method of claim 1, wherein the color pixel array includes red, green, and blue color pixels.

7. The method of claim 1, wherein the color pixel array includes cyan, magenta, and yellow pixels.

8. The method of claim 1, wherein the image sensor comprises a complementary metal-oxide semiconductor ("CMOS") image sensor.

9. An image sensor, comprising:
a color filter array ("CFA") for acquiring image data having X columns and Y rows of pixels;
sense amplifiers coupled to the CFA for reading out image data from the CFA;
multiplexing circuitry coupling the sense amplifiers to the CFA, wherein the multiplexing circuitry timeshares each sense amplifier across multiple columns and multiple rows of the CFA;
a serial communication channel output coupled to receive the image data from the sense amplifiers and serially output the image data off-chip of the image sensor; and
control circuitry coupled to control operation of the CFA and the multiplexor circuitry, the control circuitry including logic to output the image data in sequential color groups wherein each color group includes image data associated with a plurality of same color pixels,
wherein the multiplexing circuitry time shares each sense amplifier across n columns of pixels within the CFA and wherein each row of pixels within the CFA is controlled by n different transfer signals, wherein each of the n different transfer signals of a given row of the pixels is coupled to control charge transfer from a photodiode for a corresponding color group, wherein n is a positive integer.

10. The image sensor of claim 9, wherein the multiplexing circuitry time shares each sense amplifier across two columns of pixels and all rows within the two columns of pixels.

11. The image sensor of claim 10, wherein the multiplexing circuitry time shares each sense amplifier across two rows of pixels and all columns within the two rows of pixels.

12. The image sensor of claim 9, wherein the serial communication channel output comprises an analog voltage level output.

13. The image sensor of claim 12, wherein the serial communication channel output further comprises a serial data port.

14. The image sensor of claim 9, wherein the image sensor is included within an endoscope.

15. The image sensor of claim 9, wherein the CFA comprises a complementary metal-oxide semiconductor ("CMOS") image sensor array.

16. The image sensor of claim 9, wherein the CFA includes red, green, and blue pixels.

17. The image sensor of claim 9, wherein the CFA includes cyan, magenta, and yellow pixels.

* * * * *